United States Patent
Marrota et al.

(10) Patent No.: US 9,322,732 B2
(45) Date of Patent: Apr. 26, 2016

(54) STRAIN GAUGE PRESSURE SENSOR CIRCUIT WITH SENSOR DISCONNECT DETECTION

(71) Applicant: Hamilton Sundstrand Corporation, Charlotte, NC (US)

(72) Inventors: Edward John Marrota, Longmeadow, MA (US); Gary L. Hess, Enfield, CT (US); James Saloio, Ludlow, MA (US); Joseph T. Gostkowski, Cromwell, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 121 days.

(21) Appl. No.: 14/158,431

(22) Filed: Jan. 17, 2014

(65) Prior Publication Data
US 2015/0204745 A1      Jul. 23, 2015

(51) Int. Cl.
*G01L 9/04* (2006.01)
*G01L 27/00* (2006.01)

(52) U.S. Cl.
CPC .............. *G01L 9/04* (2013.01); *G01L 27/007* (2013.01)

(58) Field of Classification Search
CPC ............................ G01L 27/007; G01P 21/00
USPC .............................................. 73/720; 324/549
See application file for complete search history.

(56) References Cited

U.S. PATENT DOCUMENTS

| | | | | |
|---|---|---|---|---|
| 4,393,347 A * | 7/1983 | Looper | ........................ | 324/126 |
| 4,633,424 A * | 12/1986 | Norberg et al. | ............... | 702/87 |
| 5,440,234 A * | 8/1995 | Kondo | ......................... | 324/526 |
| 6,040,779 A * | 3/2000 | Pfaff et al. | ................... | 340/661 |
| 6,422,088 B1 * | 7/2002 | Oba et al. | ...................... | 73/754 |
| 7,285,964 B1 * | 10/2007 | Hsu et al. | ..................... | 324/707 |
| 2004/0193988 A1 * | 9/2004 | Saloio | ......................... | 714/742 |
| 2007/0115005 A1 * | 5/2007 | Shimizu et al. | ............... | 324/549 |
| 2011/0118997 A1 * | 5/2011 | Kurtz et al. | ..................... | 702/53 |

FOREIGN PATENT DOCUMENTS

| | | | |
|---|---|---|---|
| EP | 1471905 | 4/1977 | |
| EP | 0585024 A2 | 2/1994 | |
| EP | 1111344 A1 | 6/2001 | |
| EP | 1462769 A2 * | 9/2004 | ............... G01D 3/08 |
| EP | 1795903 A2 | 6/2007 | |
| JP | H01233302 A | 9/1989 | |

(Continued)

OTHER PUBLICATIONS

Author: Unknown, Title: "Precision Analog Applications Seminar, Bridge Measurement Systems, Section 5", Date (from Wayback Machine): Mar. 24, 2012, Publisher: Texas Instruments, pp. 1-33.*

(Continued)

*Primary Examiner* — Lisa Caputo
*Assistant Examiner* — Roger Hernandez-Prewitt
(74) *Attorney, Agent, or Firm* — Kinney & Lange, P.A.

(57) ABSTRACT

An electronic circuit for processing signals from a strain gauge pressure sensor includes an anti-alias filter, an analog-to-digital conversion circuit, and a detection circuit for detecting when the sensor is unexpectedly disconnected from the signal processing circuit. The detection circuit provides a yes/no indication of the connection of the pressure sensor to the circuit based upon whether a common mode voltage associated with one of the signal terminals of the pressure sensor is out of range.

11 Claims, 2 Drawing Sheets

(56) References Cited

FOREIGN PATENT DOCUMENTS

| | | |
|---|---|---|
| JP | 103327736 A | 12/1998 |
| JP | 2005037318 A | 2/2005 |

OTHER PUBLICATIONS

The United Kingdom Search Report mailed Jul. 7, 2015 for United Kingdom application No. FB1500841.0, 5 pages.

* cited by examiner

STRAIN GAUGE PRESSURE SENSOR CIRCUIT WITH SENSOR DISCONNECT DETECTION

BACKGROUND

Strain gauge pressure sensors can be used to produce pressure inputs for use by control and monitoring systems. The pressure inputs from strain gauge pressure sensors can be in the form of an analog differential voltage that varies as a function of sensed pressure. This differential voltage is converted to a digital format using a high speed analog-to-digital (A/D) converter. The analog signal from the strain gauge pressure sensor must be conditioned by electronic circuitry to filter the input and to provide sensor disconnect detection. The filter provides a low-pass cutoff frequency that is needed for converting of the analog signal to digital format using the A/D converter, and for attenuating electrical noise and pressure fluctuation from the strain gauge pressure sensor. The off-scale detection provides a full scale reading at the A/D converter if the pressure sensor is unexpectedly disconnected from the electronic circuit. When the signal from the strain gauge pressure sensor is used in a control system, such as an engine control system used on an aircraft, a short fault detection time is desired so that the control system controls based on an actual pressure sensor input, and not on faulty input that is disconnected.

The requirements for anti-alias and noise attenuation filtering and for rapid off-scale detection can be inconsistent with one another. For example, the requirements for low pass filtering can result in use of a large capacitance to provide a desired low-pass cutoff frequency. The large capacitance used in the low pass filter circuitry can result in an undesirably long off-scale detection time.

SUMMARY

A circuit for producing a digital pressure value includes a strain gauge pressure sensor, a filter circuit, a conversion circuit, and a disconnect detection circuit. The strain gauge pressure sensor produces an analog differential sensor signal that is a function of sensed pressure. The filter circuit is connected to the strain gauge pressure sensor for low-pass filtering the analog differential sensor signal. The conversion circuit converts the low-pass filtered differential signal to a digital pressure value. The disconnect detection circuit provides a disconnect detection signal that indicates when the strain gauge pressure sensor is disconnected based on a common mode voltage associated with the differential sensor signal.

A method of detecting whether a strain gauge pressure sensor is connected to a signal processing circuit includes providing an analog differential sensor signal to a first pair of inputs of a multiplexer and an analog differential disconnect detection signal to a second pair of inputs of the multiplexer. The sensor signal and the disconnect signal are periodically amplified and digitized, and detection of whether the sensor is disconnected is based on the amplified and digitized disconnect detection signal.

DETAILED DESCRIPTION

Figure 1:
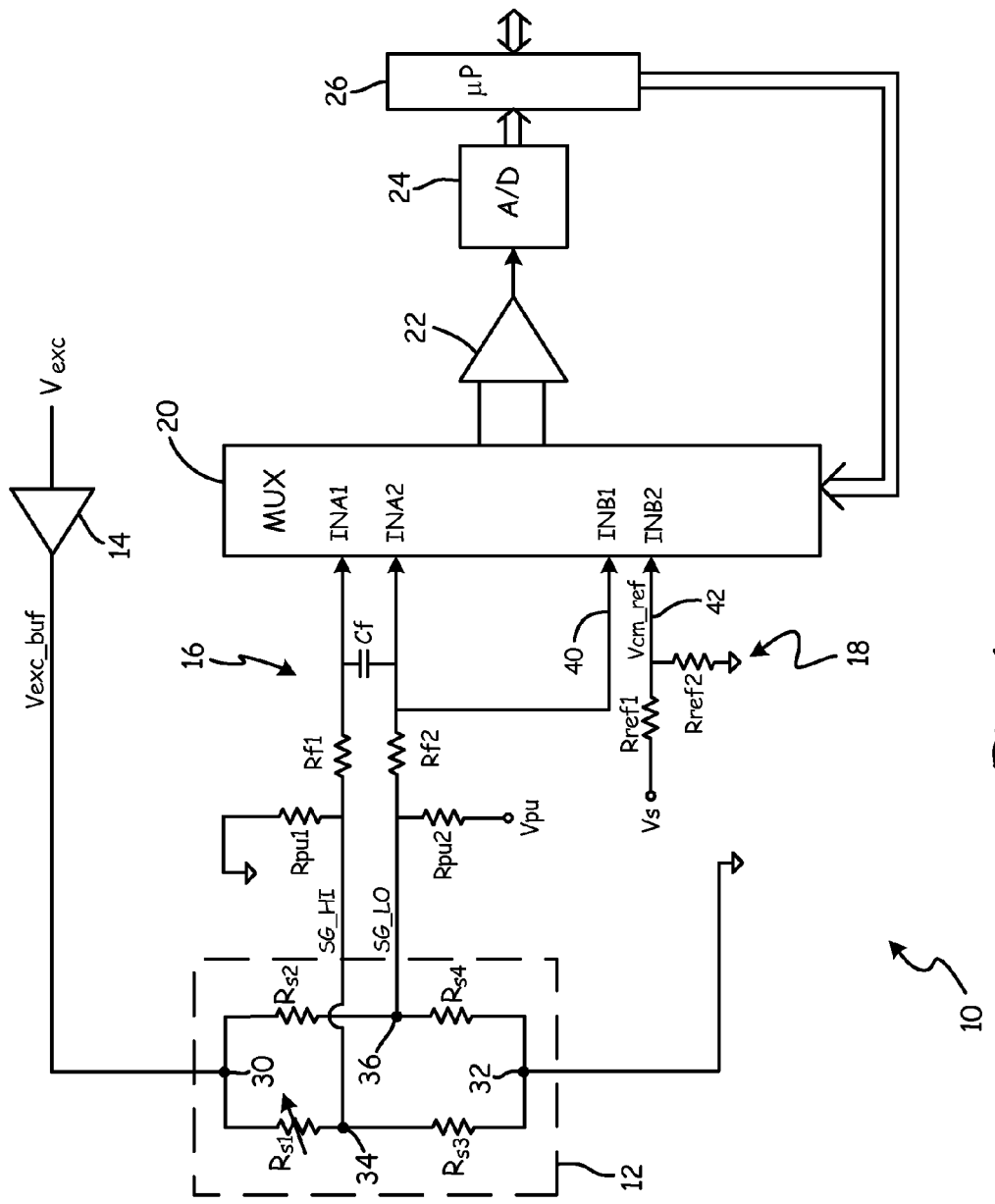
FIG. 1 shows an electric schematic diagram of a circuit for processing signals from a strain gauge pressure sensor that provides both anti-alias filtering and an indication of whether the sensor is disconnected.

FIG. 1 shows signal processing circuit 10, which converts the analog signals from strain gauge pressure sensor 12 to produce digital data and commands to be used for control or monitoring. Circuit 10 includes buffer 14, filter circuit 16, disconnect detection circuit 18, differential analog multiplexer (MUX) 20, gain amplifier 22, analog-to-digital (A/D) converter 24, and microprocessor 26.

Strain gauge sensor 12 has power terminals 30 and 32 and sensor terminals 34 and 36. Resistors $R_{s1}$, $R_{s2}$, $R_{s3}$, and $R_{s4}$ of strain gauge pressure sensor 12 are connected in a wheatstone bridge configuration, with resistor $R_{s1}$ connected between power terminal 30 and sensor output terminal 34, resistor $R_{s2}$ connected between power terminal 30 and sensor output terminal 36, resistor $R_{s3}$ connected between sensor output terminal 34 and power terminal 32, and resistor $R_{s4}$ connected between sensor output terminal 36 and power terminal 32. Excitation of strain gauge sensor 12 is provided between terminals 30 and 32. Buffer 14 provides excitation voltage Vexc_buf to power terminal 30 of sensor 12. Power to buffer 14 is provided in the form of excitation voltage Vexc. Power terminal 32 of sensor 12 is connected to ground. In one embodiment, excitation Vexc_buf is 10 volts dc.

In the embodiment illustrated in FIG. 1, resistor $R_{s1}$ of sensor 12 varies in resistance as a function of pressure. In other embodiments, a different resistor of the wheatstone bridge, or multiple resistors in the wheatstone bridge can vary as a function of pressure.

Resistors $R_{s1}$ and $R_{s3}$ form a voltage divider, so that the voltage at sensor output terminal 34 is a function of the voltage between terminals 30 and 32 and the resistances of $R_{s1}$ and $R_{s3}$. Similarly, resistors $R_{s2}$ and $R_{s4}$ form a voltage divider between terminals 30 and 32, so that the voltage at terminal 36 is a function of the resistances of $R_{s2}$ and $R_{s4}$ and the voltage between terminals 30 and 32.

In FIG. 1, the voltage at terminal 34 is labeled as SG_HI. The voltage at terminal 36 is labeled as SG_LO. In one embodiment, in which the voltage between terminals 30 and 32 is 10 volts, the differential voltage between SG_HI and SG_LO may be in a range of about 0 to about 100 millivolts. A common mode voltage of SG_HI and SG_LO may be in a range between 3 volts and 9 volts, depending upon the resistance values selected for resistors $R_{s1}$-$R_{s4}$.

Filter 16 is formed by resistors Rf1 and Rf2 and capacitor Cf. Resistor Rf1 is connected between terminal 34 of sensor 12 and input INA1 of differential analog multiplexer 20. Resistor Rf2 is connected between terminal 36 of sensor 12 and input INA2 of differential analog multiplexer 20. Capacitor Cf is connected between terminals INA1 and INA2.

The purpose of filter 16 is to remove high frequency noise in the signals from terminals 34 and 36 and to provide anti-aliasing in analog-to-digital conversion. In one embodiment, the low-pass filter cutoff frequency is about 17 Hz. In that case, resistors Rf1 and Rf2 may be on the order of 10K ohms each. Capacitor Cf may have a capacitance in the order of 0.47 µF or greater.

Disconnect detection circuit 18 includes pull up resistors Rpu1 and Rpu2, a voltage divider formed by resistors $R_{ref1}$ and $R_{ref2}$, and input lines 40 and 42. Pull up resistor Rpu1 is connected between sensor output terminal 34 and ground. Pull up resistor Rpu2 is connected between sensor output terminal 36 and pull up voltage Vpu. In this embodiment, voltage Vpu is selected to be larger than the maximum differential voltage between terminals 34 and 36, and less than the minimum common mode voltage. For example, Vpu can be on the order of 0.5 volts. Resistors Rpu1 and Rpu2 are very large (e.g., 10 Mohms), so that during normal operation the presence of pull up resistors Rpu1 and Rpu2 will not affect the differential pressure signal applied to input terminals INA1 and INA2 of differential analog multiplexer 20.

Resistors $R_{ref1}$ and $R_{ref2}$ form a voltage divider that is connected between supply voltage Vs and ground. The output of the voltage divider is a reference voltage Vcm_ref, which is supplied through line 42 to input INB2 of multiplexer 20. Vcm_ref is selected to be lower than the common mode voltage of SG_HI and SG_LO. Input line 40 is connected between resistor Rf2 and input INB1 of multiplexer 20. Voltage at INB1, therefore, is a function of SG_LO, and is the same voltage applied to input INA2 of multiplexer 20.

Multiplexer 20 is a differential analog multiplexer. In the embodiment shown in FIG. 1, only two differential pairs of inputs are shown INA1/INA2 and INB1/INB2. In other embodiments, additional differential input pairs may also be used. Differential analog multiplexer 20 is, for example, an 8:1 multiplexer, in which eight possible differential signals can be routed selectively by multiplexer 20 to the inputs of gain amplifier 22.

Gain amplifier 22 has a gain of, for example, 100. The output of gain amplifier 22 is applied to the input of A/D converter 24, which converts the analog output of gain amplifier 22 to a digital value that is provided to microprocessor 26. A particular differential signal being amplified by gain amplifier 22 is selected by microprocessor 26, which provides control inputs to multiplexer 20 to select one of the differential input pairs for connection to the input of gain amplifier 22. Microprocessor 26 may step or scan through each of the differential input pairs in a cycle, so that microprocessor 26 periodically receives a digital sensor value representing the differential sensor signal at inputs INA1 and INA2, and periodically receives a digital disconnect detection value representing the differential disconnect detection signal presented at inputs INB1 and INB2. Microprocessor 26 produces a pressure measurement value based upon the digital sensor value from A/D converter 24, which is based on the amplified differential signal from sensor 12. The pressure measurement value may be supplied by microprocessor 26 to other monitoring or control circuitry or systems.

Based upon the differential disconnect detection signal appearing at inputs INB1 and INB2, microprocessor 26 can monitor whether sensor 12 has become disconnected from circuit 10. In the case of a disconnect condition, microprocessor 26 can provide an output indicating that sensor 12 is disconnected or not functioning properly.

When sensor 12 is connected in circuit 10 and operating properly, pull-up resistors Rpu1 and Rpu2 will not affect the pressure measurement values produced by microprocessor 26. When one or more of terminals 30, 32, 34, or 36 of sensor 12 become disconnected, pull-up resistors Rpu1 and Rpu2 cause SG_HI or SG_LO, or both, to change so that microprocessor 26 can identify that a disconnect condition has occurred. Detection can occur as a result of a change in the differential voltage at inputs INB1 and INB2 of multiplexer 20.

Although connection problems with sensor 12 also can be detected by changes in the differential sensor signal presented at INA1 and INA2, the presence of anti-alias filter 16 causes a significant delay in the detection of a disconnect condition. A change in differential voltage between INA1 and INA2 requires filter capacitor Cf to charge or discharge. The time constant of discharging from Cf through Rf1 and Rpu1 so that SG_HI is pulled down to ground is long, because capacitor Cf is on the order of one microfarad, resistor Rf1 is on the order of 10 Kohm and pull-down resistor Rpu1 is on the order of 10 Mohms. Similarly, the time constant for pulling SG_LO down to Vpu is also long because of the capacitance of capacitor Cf and the resistances of filter resistor Rf2 and pull-down resistor Rpu2.

Disconnect detection circuit 18 provides an alternative and faster way to identify a disconnect condition with sensor 12. Inputs INB1 and INB2 of multiplexer 20 allow microprocessor 26 to monitor the difference between the common mode voltage of SG_LO and reference voltage Vcm_ref established by the voltage divider formed by $R_{ref1}$ and $R_{ref2}$.

Under normal conditions in which sensor 12 is connected to circuit 10, both SG_HI and SG_LO are near the common mode voltage, with the difference between them being in a specified range, typically between 0 and 100 millivolts. When microprocessor 26 causes multiplexer 20 to connect INB1 and INB2 to gain amplifier 22, the voltage on line 40 will be approximately the common mode voltage, while the reference voltage on line 42 Vcm_ref will be a value that is substantially less than the common mode voltage. As a result, an out-of-range positive value will be presented to microprocessor 26 whenever it checks INB1 and INB2 and sensor 12 is connected to circuit 10.

If sensor 12 is disconnected from circuit 10, the voltage present at INB1 will decrease rapidly to voltage Vpu. This voltage will be less than reference voltage Vcm_ref present at input INB2. As a result, the differential voltage between INB1 and INB2 will be negative and, when amplified by gain amplifier 22, will cause an out-of-range negative value to be presented by A/D converter 24 to microprocessor 26. As a result, a disconnect event that affects the SG_LO signal line will cause microprocessor 26 to receive a negative out of range signal that indicates a disconnect condition.

The differential voltage between INB1 and INB2 can change rapidly because it does not depend upon charging or discharging of filter capacitor Cf. The voltage at INB1 (which is the same voltage as appears at INA2) is compared to fixed reference voltage Vcm_ref at INB2. The reference voltage does not depend on the state-of-charge of filter capacitor Cf. In contrast, if the differential sensor signal between INA1 and INA2 is used to detect a disconnect condition, changes to the differential voltage between INA1 and INA2 depends on charging or discharging of capacitor Cf.

Disconnect detection circuit 18 allows identification of a disconnect condition very rapidly compared to using the differential voltage between INA1 and INA2 to detect a disconnect condition. For example, with disconnect detection circuit 18, the detection of a disconnect condition can be achieved in about 30 to 50 milliseconds rather than several seconds. This time difference is important because the pressure sensed by strain gauge pressure sensor 12 may be used to monitor or control operation of critical machinery, such as an aircraft engine, and therefore the reliability of the pressure measurement can be crucial.

In the embodiment shown in FIG. 1, disconnect detection circuit 18 makes use of the SG_LO line for comparison to reference voltage Vcm_ref. In some embodiments, the voltage on the SG_HI line can be used instead of or in addition to voltage on SG_LO. If both SG_HI and SG_LO are used in detecting disconnect conditions, then an additional pair of inputs of differential analog multiplexer 20 are used in order to compare the voltage on the SG_HI line to a reference voltage, such as Vcm_ref.

With the use of the disconnect detection circuit 18, faster detection of disconnect conditions can be achieved without sacrificing the low-pass filter characteristics of anti-alias filter 16. Disconnect detection circuit 18 uses the common mode voltage from one of the differential inputs (either SG_HI or SG_LO) to detect when sensor 12 is unexpectedly disconnected from circuit 10, instead of using the same differential inputs used for producing the pressure sensor measurement value. A separate multiplexer input is used to detect when common mode voltage goes out-of-range. Using this method, gain amplifier 22 will go full-scale positive when sensor 12 is connected to circuit 10, and will go full-scale negative when sensor 12 is disconnected from circuit 10. The signal produced can then be used as a yes/no indication on the connection of sensor 12 to circuit 10. The detection time is greatly improved, and is not greatly influenced by the anti-alias cutoff frequency setpoint.

In another embodiment circuit 10 includes a series resistor in line 40. The series resistor will limit current fed back to capacitor Cf when amplifier 22 saturates.

Discussion of Possible Embodiments

A circuit for producing a digital pressure value includes a strain gauge pressure sensor, a filter circuit, a conversion circuit, and a disconnect detection circuit. The strain gauge pressure sensor produces an analog differential sensor signal that is a function of sensed pressure. The filter circuit is connected to the strain gauge pressure sensor for low-pass filtering the analog differential sensor signal. The conversion circuit converts the low-pass filtered differential signal to a digital pressure value. The disconnect detection circuit provides a detection signal that indicates when the strain gauge pressure sensor is disconnected based on a common mode voltage associated with the differential sensor signal.

The circuit of the preceding paragraph can optionally include, additionally and/or alternatively, any one or more of the following features, configurations and/or additional components:

The disconnect detection signal is a differential disconnect detection signal based on the common mode voltage and a reference voltage.

The disconnect detection circuit includes a reference circuit for providing the reference voltage.

The conversion circuit converts the differential disconnect detection signal to a digital disconnect detection value.

The circuit includes a differential analog multiplexer having a first pair of inputs for receiving the low-pass filtered analog differential sensor signal and a second pair of inputs for receiving the differential disconnect detection signal.

The circuit includes a gain amplifier connected to an output of the differential analog multiplexer for producing an amplified sensor signal when the first pair of inputs are connected to the output of the differential analog multiplexer, and for producing an amplified disconnect detection signal when the second pair of inputs are connected to the output of the differential analog multiplexer; and an analog-to-digital converter for converting the amplified sensor signal to the digital pressure sensor value and for converting the amplified disconnect detection signal to a digital disconnect detection value.

The circuit includes a digital processor for producing a disconnect indication signal based upon the digital disconnect detection value.

The digital disconnect detection value has a first polarity when the sensor is connected to the circuit and a second polarity when the sensor is disconnected from the circuit.

Figure 2:
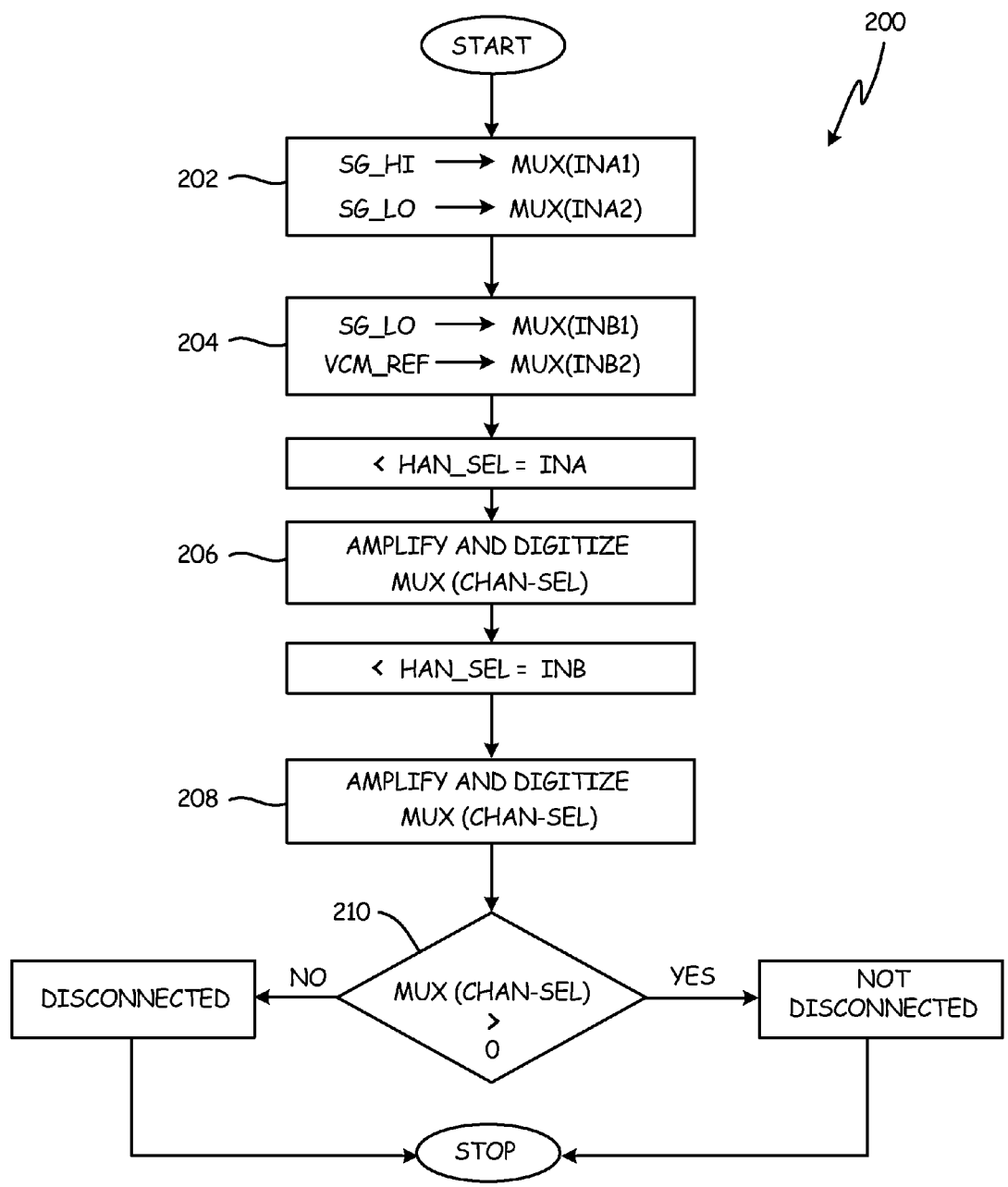
FIG. 2 is a flow chart of an exemplary method of detecting whether a strain gauge pressure sensor is connected to a signal processing circuit.

FIG. 2 is a flow chart of an exemplary method of detecting whether a strain gauge pressure sensor is connected to a signal processing circuit. A method 200 of detecting whether a strain gauge pressure sensor is connected to a signal processing circuit includes providing an analog differential sensor signal to a first pair of inputs of a multiplexer (step 202) and an analog differential disconnect detection signal to a second pair of inputs of the multiplexer (step 204). The sensor signal and the disconnect signal are periodically amplified and digitized (steps 206 and 208, respectively), and detection of whether the sensor is disconnected is based on the amplified and digitized disconnect detection signal (step 210).

The analog differential disconnect detection signal includes providing a first signal representative of a common mode voltage associated with one signal terminal of the sensor to a first input of the second pair of inputs of the multiplexer, and providing a second signal representative of a reference voltage to a second input of the second pair of inputs of the multiplexer.

Detecting whether the sensor is disconnected is based on polarity of the amplified and digitized disconnect detection signal.

Providing an analog differential sensor signal includes low-pass filtering of the analog differential sensor signal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A circuit comprising:
a strain gauge pressure sensor having signal terminals that provide an analog differential sensor signal as a function of sensed pressure;
a filter circuit connected to the strain gauge pressure sensor signal terminals for low-pass filtering the analog differential sensor signal;
a conversion circuit for converting the low-pass filtered analog differential sensor signal to a digital pressure value representative of the sensed pressure; and
a disconnect detection circuit for providing a detection signal that indicates when the strain gauge pressure sensor is disconnected based on a low-frequency common mode voltage associated with one of the signal terminals of the strain gauge pressure sensor,
wherein the disconnect detection signal is a differential disconnect detection signal based on the low-frequency common mode voltage and a reference voltage.

2. The circuit of claim 1, wherein the disconnect detection signal is a differential disconnect detection signal based on the common mode voltage and a reference voltage.

3. The circuit of claim 1, wherein the disconnect detection circuit includes a reference circuit for providing the reference voltage.

4. The circuit of claim 1, wherein the conversion circuit converts the differential disconnect detection signal to a digital disconnect detection value.

5. The circuit of claim 4 and further comprising:
a differential analog multiplexer having a first pair of inputs for receiving the low-pass filtered analog differential sensor signal and a second pair of inputs for receiving the differential disconnect detection signal.

6. The circuit of claim 5, wherein the conversion circuit comprises:
    a gain amplifier connected to an output of the differential analog multiplexer for producing an amplified sensor signal when the first pair of inputs are connected to the output of the differential analog multiplexer, and for producing an amplified disconnect detection signal when the second pair of inputs are connected to the output of the differential analog multiplexer; and
    an analog-to-digital converter for converting the amplified sensor signal to the digital pressure sensor value and for converting the amplified disconnect detection signal to a digital disconnect detection value.

7. The circuit of claim 6 and further comprising:
    a digital processor for producing a disconnect indication signal based upon the digital disconnect detection value.

8. The circuit of claim 7, wherein the digital disconnect detection value has a first polarity when the sensor is connected to the circuit and a second polarity when the sensor is disconnected from the circuit.

9. A method of detecting whether a strain gauge pressure sensor is connected to a signal processing circuit, the method comprising:

providing an analog differential sensor signal from the sensor to a first pair of inputs of a multiplexer;
providing an analog differential disconnect detection signal to a second pair of inputs of the multiplexer;
periodically amplifying and digitizing the sensor signal and the disconnect detection signal received from the multiplexer; and
detecting whether the sensor is disconnected based on the amplified and digitized disconnect detection signal,
wherein providing the analog common-mode disconnect detection signal comprises:
    providing a first signal representative of a common-mode voltage associated with one signal terminal of the sensor to a first input of the second pair of inputs of the multiplexer; and
    providing a second signal representative of a reference voltage to a second input of the second pair of inputs of the multiplexer.

10. The method of claim 9, wherein detecting whether the sensor is disconnected is based on polarity of the amplified and digitized common-mode disconnect detection signal.

11. The method of claim 9, wherein providing an analog differential sensor signal includes low-pass filtering of the analog differential sensor signal.

* * * * *